Oct. 27, 1931.    W. DE BACK    1,828,961
COOKING APPARATUS
Filed Jan. 22, 1927    2 Sheets-Sheet 2
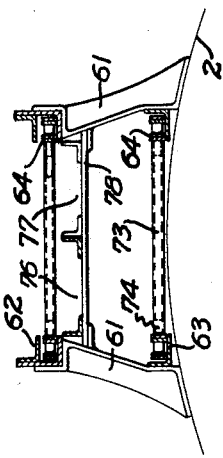
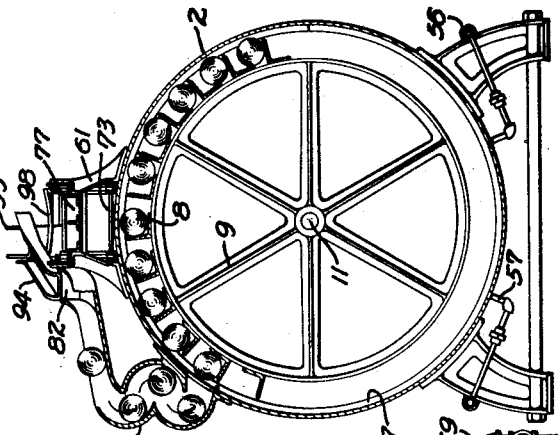

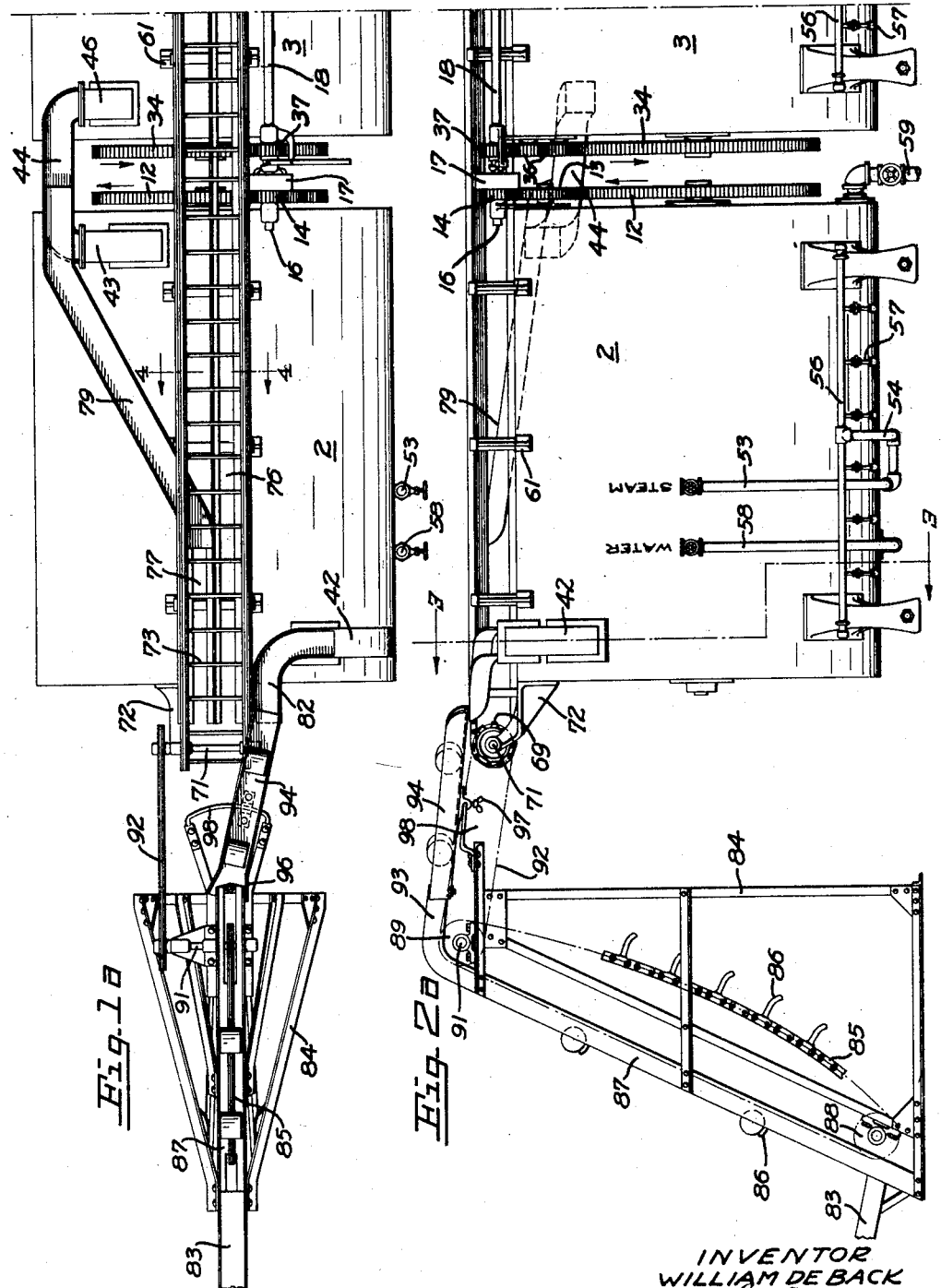

Patented Oct. 27, 1931

1,828,961

UNITED STATES PATENT OFFICE

WILLIAM DE BACK, OF SAN LEANDRO, CALIFORNIA, ASSIGNOR TO SPRAGUE-SELLS CORPORATION, OF HOOPESTON, ILLINOIS, A CORPORATION OF DELAWARE

COOKING APPARATUS

Application filed January 22, 1927. Serial No. 162,912.

My invention relates to an apparatus for treating packaged goods and especially to a combined cooker and cooler for handling filled cans of food material.

An object of the invention is the provision of a cooking apparatus comprising separate cooking drums with conveying means for enabling the drums to be most effectively utilized either separately or in combination to vary the length of the cook.

Another object of the invention is the provision of a cooking apparatus in which the time of treatment of the food material may be varied in accordance with the necessities of the case.

Another object of the invention is the provision of improved driving mechanism whereby the units of the apparatus may be operated in proper combination.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Figures 1a and 1b together constitute a plan view of my cooking apparatus and Figures 2a and 2b constitute a side elevation of the same. Portions of both figures are omitted to reduce their length.

Figure 3 is a vertical sectional view thru the apparatus. The plane of section is indicated by the line 3—3 near the left hand side of Figure 2a.

Figure 4 is a vertical sectional view thru the feed track conveyer. The plane of section is indicated by the line 4—4 near the left hand side of Figure 1a.

In terms of broad inclusion, the apparatus of my invention comprises a plurality of drums in which suitable conveying mechanism is included to carry the cans therethru. The drums are preferably in axial alinement and means is provided for driving all the conveyers in the drums together, or the conveyers of selected drums, at desired speeds. Each of the drums is joined by a connecting track to the one next in line, so that if desired, cans may pass successively thru all the drums. A supply track is provided for conducting the cans to the apparatus, and a feed track beginning near the end of the supply track, conducts the cans to each of the connecting tracks. Means are provided for shunting cans from the supply track to the selected feed track, so that the cans may be passed thru all of the drums, or thru the second and successive drums, or thru the third and successive drums in accordance with the length of time which it is desired to cook the material in the cans. Thus, by a proper selection of the drums and speeds, the length of the cook may be fixed accurately in accordance with the requirement of the food product in the cans, since these different products, such as cherries, apricots, peaches, pears and tomatoes require a different cooking period for each. Preferably the last drum in the series of drums is a cooler in which the hot cans are cooled off to stop the cooking process.

More particularly, my apparatus comprises a series of axially alined drums 2, 3, 4 and 5. Any number of drums may be utilized, but three cooking drums and one cooling drum will be found sufficient for a wide range of work. Each of the drums contain a spiral track 7, around which the cans 8 in the drum are moved on the conveyer reel 9. This mechanism is well known in the art and need not be explained in detail here. The shaft 11 on which the reel for the drum 2 is mounted, terminates in a gear 12 on the outside of the drum; and this gear is connected by the gear 13, with the driving gear 14, on the shaft 16 journaled on the end of the drum 2, and connected by the clutch 17 with the shaft 18 journaled on the drum 3. The shaft 18 is also connected by a clutch 19 with the shaft 21 journaled on the drum 4. The shaft 21 is driven through suitable gear connections in the gear box 22, which is of well known construction and in which the desired gear combinations may be secured by movement of the control lever 23. The driving shaft 24 for the gear box is rotated by a worm wheel and worm connection 26 with the shaft 27. This shaft is driven by the loose pulley 28 between which and the shaft is interposed a clutch 29. Power from any suitable source is transmitted to the pulley 28 by the belt 30.

The conveyer in drum 4 is provided with a gear 31, which like gear 12, is arranged at the discharge end of the drum and is connected by a gear 32 with the driving gear 33 on the shaft 21. On the left hand end of the shaft of the conveyer in drum 3 is fixed the gear 34, connected by the gear train 36 with the driving gear 37, fixed on the shaft 18; and a gear 38 on the left hand end of the shaft of the conveyer in the cooler drum 5 is connected by the gears 39, with the driving gear 41 on the end of the shaft 21. The driving gears are thus arranged between drums 2 and 3, and 4 and 5 because of certain practical considerations of manufacture and operation.

It will thus be seen that the shaft 21 and its alined extensions may be driven at any one of the selected speeds within the range, say eight speeds, of the gear box 22 and that by the use of the clutches, the conveyer in drum 4 may be operated alone, or with the conveyers in drums 3 and 2. Since the cooling drum is required when any of the cooking drums are operated, the connections are such that the conveyer in drum 5 is driven whenever the shaft 21 is driven.

If it be assumed, for example, that cans are fed to the apparatus at the rate of 60 cans per minute and require thirty minutes to pass thru the three cooking drums when moving at the same velocity at which they are fed to the first drum, and the gear box is so proportioned that the conveyers in the three drums may be stepped up in speed thru eight changes each cutting two minutes off of the time required to pass thru the three drums, then by a proper selection of speeds and drums, a cooking range, varying from five and one-third to ten and two-third minutes, by two-thirds of a minute, and from ten and two-third minutes to twenty minutes, varying by one and one-third minutes, and from twenty minutes to thirty minutes, varying by two minutes, is secured.

It will be noted that with the shaft 21 always revolving in the same direction, the conveyer reels revolve in opposite directions in adjacent drums and this is done so that cans emerging from one end of one drum can be introduced into the succeeding drum with the minimum amount of travel between the two drums.

The first drum 2 of the series of drums is provided with the receiving chute 42 at one end on one side and at the opposite end on the opposite side with the discharge chute 43, joined by the connecting track 44 with the receiving chute 46 of the second drum 3. The second drum at the opposite end and side is provided with the discharge chute 47 joined by the connecting track 48 with the receiving chute 49 of the third drum 4. In a similar way the third drum 4 is joined to the cooling drum 5 by the connecting track 51. Cans emerge from the cooling drum thru the discharge chute 52, upon a suitable table or conveyer not shown.

Each of the cooking drums is provided with steam thru the valved pipe 53, connected at one end to any suitable source of steam, and at the other to the center of the distributer pipe 54, connected at its ends to the manifold pipes 56, one of which is arranged on each side of each drum adjacent the bottom thereof. The manifold pipes are each connected by a plurality of smaller pipes 57 with the bottom of the drum. A valved pipe 58, connected to a suitable water supply, is also connected into the bottom of the drum so that the desired quantity of water may be admitted thereto. A valved drain pipe 59 is provided in each drum thru which the drum may be emptied.

Disposed on the top of the first two drums on suitable legs 61, is a structure formed largely of angle iron members and providing guideways 62 and 63 in which the two endless chains 64 may run. The chains pass over sprockets 66 arranged on the shaft 67 disposed near the discharge end of the second drum 3 and which is driven by the chain 68 from the shaft 27. Adjacent the receiving end of the first drum, the chains 64 pass over sprockets 69 on the shaft 71, journaled in a suitable bracket 72 fixed on the end of the drum. The two chains 64 are connected at suitable intervals by pieces of pipe 73 journaled on studs 74 projecting from the chains, so that the pipe may rotate freely.

Extending longitudinally between and somewhat below the guideways 62 are angle pieces forming the feed tracks 76 and 77, supported on cross-pieces 78, extending between the legs 61. The feed track 77 discharges into a trackway 79 curved outwardly and downwardly to discharge into the connecting track 44 between the drums 2 and 3. The other feed track 76 discharges into a trackway 81 curving outwardly and downwardly to the connecting track 48 between the drums 3 and 4. Adjacent these two trackways at their beginning, curving downwardly, is a short trackway 82 which discharges into the receiving chute 42.

The proportions and arrangement of parts are such that cans in the feed tracks below the cross bars 73 of the upper reaches of the chains 64 are pushed along by the cross bars when the chains are in motion, until they drop into the connecting trackway and roll by gravity to the receiving chute at the end of the trackway. Cans deposited at the beginning of the trackway 82 roll directly into the first drum. Means are provided for delivering cans from the supply track 83 to a selected feed track. Arranged on a separate frame 84 adjacent the end of the first drum is an elevator including the chain 85 and arms 86 operating in the trackway 87. The chain passes over suitable sprockets 88 at the bottom of the frame, and 89 at the top thereof, the upper sprocket being fixed on a shaft 91 connected by the chain 92 with the shaft 71. Cans from the supply track 83 are delivered on to the arms 86 and are carried upwardly to the top of the elevator and permitted to roll down into the downwardly sloping end 93 of the elevator track 87. Pivotally mounted on the end of the elevator track is a transfer track 94, having its side guide flanges 96 flared at its pivoted end to permit the track to be swung on either side. The free end of the transfer track may be positioned over any one of the three trackways 82, 76 or 77 and locked in the selected position by means of the clamp screw 97 adapted to impinge against the arcuate rod 98 held in fixed position below the transfer track.

From the above it will be clear that if the longest possible period of cooking is desired, the transfer track will be alined with the trackway 82 as shown in the drawings so that the cans are fed into the receiving chute 42 of the first drum. The gear box is then set to drive the shaft 21 at the lowest speed, which will be such that the reel conveyers in the drums will move at the same velocity as the incoming cans. The cans then pass successively thru the drums, being cooked the desired time in the first three drums and quenched or cooled in the last drum, finally emerging from the discharge chute 52. Without changing the setting of the transfer track, but by speeding up the conveyer reels, the length of cook may be varied over a considerable range, and by alining the transfer track with one or the other of the trackways 76 or 77, and suitably adjusting the speeds by the gear box, all required additional variations in time of cook for any food product may be readily secured.

When one of the drums is not being used, steam may be shut off from it and the connecting clutch for the conveyer reel thrown out. Thus the cooking apparatus is capable of highly efficient operation since only those portions in actual use need be kept at cooking temperature and in actual operation.

I claim:

1. In an apparatus for treating packaged goods, a plurality of drums, a conveyer in each drum for carrying the packages therethru, alined power shafts, one of said shafts being adjacent each drum and connected to drive the conveyer therein, a clutch interposed between the ends of adjacent shafts whereby all or selected adjacent power shafts may be coupled for rotation together, and means for optionally varying the speed of rotation of the connected shafts.

2. In an apparatus for treating packaged goods, a series of alined drums for cooking and cooling the goods, a conveyer in each drum for carrying the packages therethru, a power shaft journaled adjacent the last two drums and connected to drive the conveyers therein, a separate power shaft journaled adjacent each of the other drums and respectively connected to drive the conveyers therein, and means for connecting the separate power shafts of adjacent drums for rotation together.

3. In an apparatus for treating packaged goods, a series of alined drums for cooking and cooling the goods, a conveyer in each drum for carrying the packages therethru, a power shaft journaled adjacent the last two drums and connected to drive the conveyers therein, a separate power shaft journaled adjacent each of the other drums and respectively connected to drive the conveyers therein, means for connecting the separate power shafts of adjacent drums for rotation together, and means for optionally varying the speed of rotation of the first mentioned power shaft.

4. In an apparatus for treating packaged goods, a plurality of drums, a conveyer in each drum for carrying the packages therethru and means for optionally connecting the conveyers in adjacent drums for rotation together.

5. In an apparatus for treating packaged goods, a plurality of drums, a conveyer in each drum for carrying the packages therethru, means for optionally connecting the conveyers in adjacent drums for rotation together, and means for optionally varying the speed of rotation of the connected conveyers.

6. In an apparatus for treating packaged goods, a plurality of drums, a conveyer in each drum for carrying the packages therethru, means for rotating one of the conveyers and means for optionally connecting the conveyers in adjacent drums for rotation together.

7. In an apparatus for treating packaged goods, a plurality of drums, a conveyer in each drum for carrying the packages therethru, means for rotating one of the conveyers, means for optionally connecting the conveyers in adjacent drums for rotation together, and means for optionally varying the speed of said rotation.

8. In an apparatus for treating packaged goods, a plurality of drums, a conveyer in each drum for carrying the packages therethru, and means including clutch mechanism for optionally connecting the conveyers in adjacent drums for rotation together.

9. In an apparatus for treating packaged goods, a plurality of drums, tracks between the drums for connecting the drums in series, a feed track extending to each drum, a conveyer in each drum for carrying packages therethru, means for rotating one of the conveyers, and means for optionally connecting the conveyers in adjacent drums for rotation together.

10. In an apparatus for treating packaged goods, a plurality of drums, tracks between the drums for connecting the drums in series, a feed track extending to each drum, a conveyer in each drum for carrying packages therethru, means for rotating one of the conveyers, means for optionally connecting the conveyers in adjacent drums for rotation together, a supply track for conducting packages to the apparatus, and means for shunting packages from the supply track to a feed track extending to the first drum in which the conveyer is active.

11. In an apparatus for treating packaged goods, a plurality of drums, tracks between the drums for connecting the drums in series, a feed track extending to each drum, a conveyer in each drum for carrying packages therethru, means for rotating said conveyers, selective means for varying the speed of said rotation, a supply track for conducting packages to the apparatus, and means for shunting packages from the supply track to a selected feed track.

12. In an apparatus for treating packaged goods, a plurality of drums, tracks between the drums for connecting the drums in series, a feed track extending to each drum, a conveyer in each drum for carrying packages therethru, means for rotating one of the conveyers, means for optionally connecting the conveyers in adjacent drums for rotation together, selective means for varying the speed of said rotation, a supply track for conducting packages to the apparatus, and means for shunting packages from the supply track to a feed track extending to the first drum in which the conveyer is active.

13. In an apparatus for treating packaged goods, a plurality of drums, a conveyor in each drum for carrying packages therethru, means for connecting all the conveyors for movement together including selective means for disconnecting certain of said conveyors, selective means for changing the speed of movement of connected conveyors, and means for varying the effective length of passage thru said apparatus.

14. In an apparatus for treating packaged goods, a plurality of drums, a conveyor in each drum for carrying the packages therethrough, means connecting adjacent drums for conducting the packages from one drum to the other, means for conducting the packages past a selected number of the drums into a selected drum, and means for connecting the conveyors in selected drums for rotation together.

15. In an apparatus for treating packaged goods, a plurality of drums, a conveyor in each drum for carrying the packages therethrough, means connecting adjacent drums for conducting the packages from one drum to the other, means for conducting the packages past a selected number of the drums into a selected drum, means for connecting the conveyors in selected drums for rotation together, and selective means for varying the speed of said rotation.

In testimony whereof, I have hereunto set my hand.

WILLIAM DE BACK.